UNITED STATES PATENT OFFICE.

PAUL GIROD, OF UGINES, FRANCE.

THERMAL TREATMENT OF METAL IN ELECTRICALLY-HEATED FURNACES.

1,066,810. Specification of Letters Patent. Patented July 8, 1913.

No Drawing. Application filed August 5, 1909. Serial No. 511,284.

*To all whom it may concern:*

Be it known that I, PAUL GIROD, a citizen of the Republic of Switzerland, residing at Ugines, Savoy, France, have invented certain new and useful Improvements in the Thermal Treatment of Metal in Electrically-Heated Furnaces; and I do hereby declare the following to be a full, clear, and exact description of the invention, such as will enable others skilled in the art to which it appertains to make and use the same.

Molten metal coming from Bessemer converters or open-hearth furnaces has not the same properties as melted steel made in crucibles or such made in electric furnaces by melting cold charges. These differences are, in part, the result of higher sulfur and phosphorus in the former metal or of a higher content of manganese and aluminium used as additions to de-oxidize the melted metal; and, in part also, the result of oxids retained in the metal, of carbon monoxid gas therein, and of nitrogen and hydrogen coming from the gases used for heating open-hearth furnaces or the blast used in bessemerizing. It has been proposed to improve such melted metal from Bessemer converters or open-hearth furnaces, by charging it while molten into crucibles and keeping it there covered and molten until evolution of gas stops and intermingled oxids have risen to the surface. This treatment certainly improves the quality of such metal. It has also been proposed to charge such molten metal into an electric furnace, for similar purposes to those just described, and, in addition, to further refine it by new fluxes placed upon it and the use of the high temperature which can be attained in the electric furnace. The temperature which can be used in practice is, however, limited by the breaking down point of the refractory materials out of which the furnaces are constructed.

The present invention is an improved thermal treatment in the electric furnace of such melted metal from Bessemer converters or open-hearth furnaces, and consists essentially in reducing the temperature of the melted metal after its entry into the electric furnace to such a degree that solidification is effected within the melted metal and preferably throughout its mass. During said partial or total solidification, a proportion of the gases contained in the melted metal is excluded from the metal. I have found that total solidification followed by cooling to 400° or 500° centigrade gives the most complete results and improvement of the product, but cooling to 700° or 900° C. gives good results, cooling to 1100° C. is an advantage, a decided even total or partial solidification at the setting point of the steel (1400° to 1500° C.) operates some improvement. After such partial or total solidification has been produced, with or without further cooling to temperatures down to incipient red heat (500° C.), the metallic contents of the furnace are re-melted by the application of electric energy, and will be found to be greatly improved in quality by this treatment.

The degree of solidification or of cooling below the setting point may be regulated by several considerations, such as the degree of improvement desired, the time necessary for the operation of cooling and re-heating, the cost of electric energy at the plant, but such degree of operation of the process must be determined in each case by circumstances such as can readily be determined by one skilled in the art.

While I do not recommend over-oxidation or super-oxidation of melted metal, past the usual stopping point, in the Bessemer or open-hearth furnace, yet such over-oxidized metal is particularly improved by the thermal treatment described as my invention, because it is particularly surcharged with deleterious gases, gas-forming ingredients, and metallic oxids.

Either after or before, but preferably after, the thermal treatment described as the process of the present invention, the melted metal may be treated with fluxes, slags, oxidizing agents, de-oxidizing agents, carburizing material, or any other of the operations performed upon it which are usual in and possible in, the electric furnace; it may also be alloyed in similar manner with the ingredients necessary to make from it special alloy steel.

Since the cooling down of a large body of metal requires a long time, or the withdrawal from it of a large quantity of heat, it will generally be advantageous to charge the melted metal into the furnace at so low a temperature as can conveniently be procured. In any case, however, no matter at what temperature the liquid metal is brought to the furnace, a considerable proportion of the heat given out by it in the furnace during its cooling to the freezing point and its partial or total solidification may be stored up or utilized by pouring the liquid metal upon more or less cold metallic or metalliferous material, (such as scrap metal, iron ore, or mixtures of scrap and iron ore) which has been previously charged into the electric furnace. One ton of hot molten steel charged into the furnace would thus, in cooling to solidified steel at 1000° C., heat approximately its own weight of cold scrap or cold charges up to 1000° C. A similar result is reached by charging cold material gradually into the melted metal after it is within the electric furnace. By thus operating, mixing cold charge material in proper quantity with the melted metal charge, the latter is more quickly partly or wholly solidified and its temperature reduced to the required or desired degree, while the heat it gives out in so doing is stored up as sensible heat in the cold material which has been thus heated, and is therefore saved to the furnace charge.

On remelting by the electric energy, the heat brought into the furnace in the hot metal appears in large part in the sensible heat of the bath, and has not been lost to the furnace, as would be the case if no cool or cold metallic or metalliferous material was used to cool down the melted metal charged and to cause it to partly or wholly solidify.

When remelted, the metal may be again treated by fluxes, slags, oxidizing agents, deoxidizing agents, carburizing material, alloying agents, or in general by any of the usual methods of treating steel possible in electric furnaces.

What I claim is:—

1. The process of treating melted metal in an electric steel furnace, which consists in effecting complete solidification of the melted metal in the furnace, further cooling to a temperature below 1100° C., and then remelting by electrically generated heat; substantially as described.

2. The process of treating melted metal in an electric steel furnace, which consists in effecting complete solidification of the melted metal in the furnace, further cooling to a temperature as low as incipient red heat, and then remelting by electrically generated heat; substantially as described.

In testimony whereof, I affix my signature, in presence of two witnesses.

PAUL GIROD.

Witnesses:
O. NOEL,
G. A. MAITTU.